(12) United States Patent
Holmes

(10) Patent No.: US 11,884,244 B2
(45) Date of Patent: Jan. 30, 2024

(54) CLIP FOR COUPLING A FAN TO A GOLF CART

(71) Applicant: Moritz Holmes, Atlanta, GA (US)

(72) Inventor: Moritz Holmes, Atlanta, GA (US)

(*) Notice: Subject to any disclaimer, the term of this patent is extended or adjusted under 35 U.S.C. 154(b) by 449 days.

(21) Appl. No.: 17/187,785

(22) Filed: Feb. 27, 2021

(65) Prior Publication Data

US 2022/0274533 A1    Sep. 1, 2022

(51) Int. Cl.
*B60R 9/06* (2006.01)
*A63B 57/00* (2015.01)

(52) U.S. Cl.
CPC ............. *B60R 9/06* (2013.01); *A63B 57/00* (2013.01)

(58) Field of Classification Search
CPC .................................. B60R 9/06; A63B 57/00
USPC ........ 248/558, 206.5, 229.15, 229.16, 230.1, 248/231.85
See application file for complete search history.

(56) References Cited

U.S. PATENT DOCUMENTS

| | | | |
|---|---|---|---|
| 5,312,037 A | 5/1994 | Hand | |
| 5,472,163 A * | 12/1995 | Callas | G09F 7/18 40/607.1 |
| 5,609,317 A * | 3/1997 | Glynn | G09F 7/12 40/607.1 |
| 5,725,356 A * | 3/1998 | Carter | F16M 11/40 D23/382 |
| 6,158,140 A | 12/2000 | Orr | |
| 6,886,270 B2 | 5/2005 | Gilmer | |
| 7,669,828 B2 | 3/2010 | Hardy et al. | |
| 7,719,437 B2 * | 5/2010 | Bertram, III | F21V 21/096 362/396 |
| 9,784,465 B2 | 10/2017 | Kumar | |
| 10,661,721 B2 | 5/2020 | Tyrer | |
| 2002/0145095 A1 | 10/2002 | Winkler | |

* cited by examiner

*Primary Examiner* — Anita M King

(57) ABSTRACT

An exemplary fan clip device for moving and increasing the movement of air from a fan for a golf cart is presented. The fan clip device is attachable to a golf cart that can hold a fan that can provide a strong throughput of air to allow the golfer to cool off and have an enjoyable experience. The fan clip device is further easily attached and detached from the golf cart, as well as portable and reusable when a next golf outing is arranged.

7 Claims, 4 Drawing Sheets

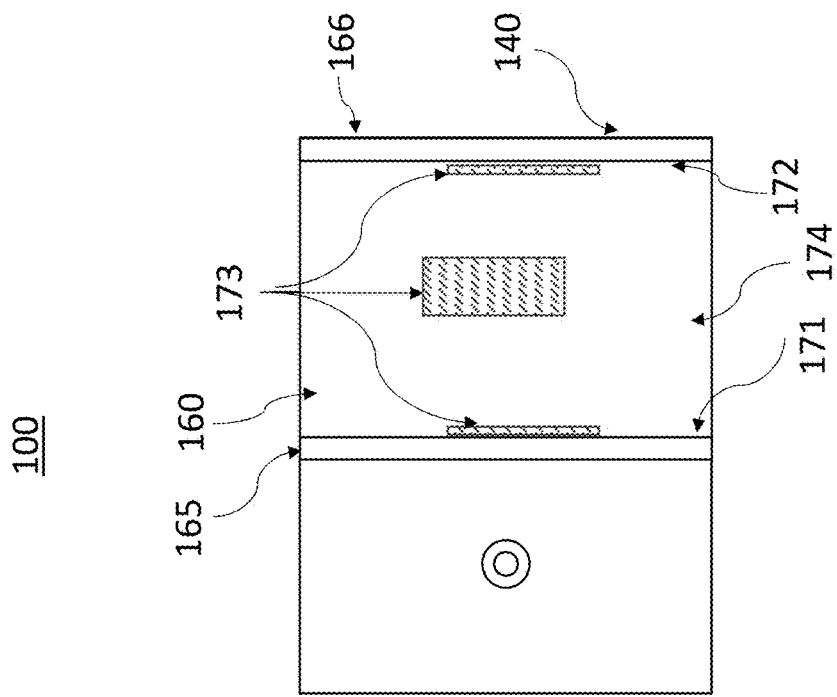
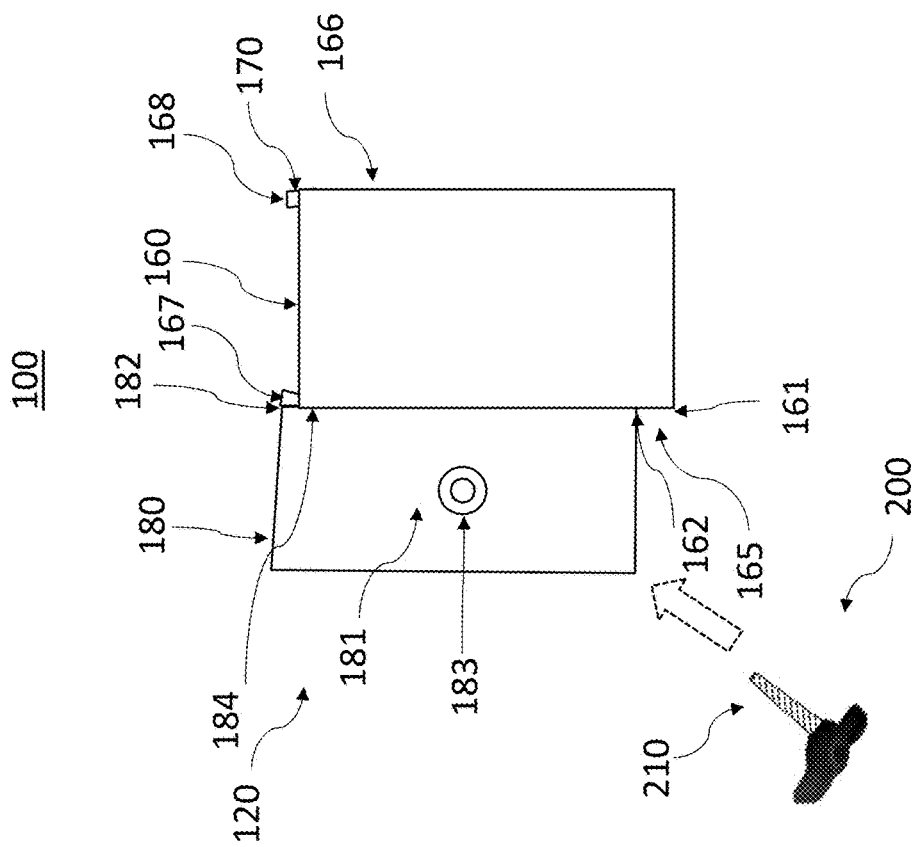
FIG. 1B
FIG. 1A

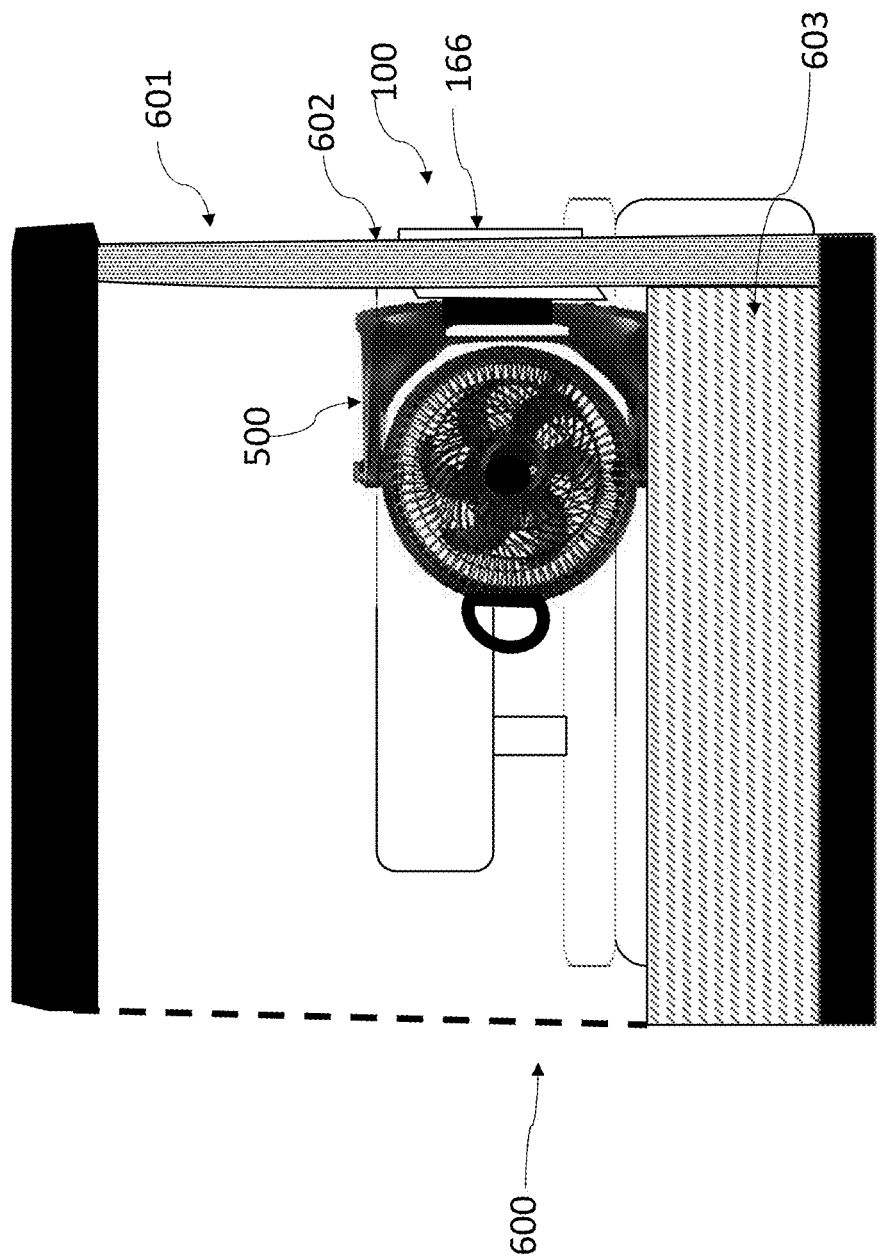

CLIP FOR COUPLING A FAN TO A GOLF CART

FIELD OF THE INVENTION

This invention relates to golf carts. More particularly, it relates to a device for providing a fan on a golf cart.

BACKGROUND

A golf cart (called golf car in ANSI standard 2130.1, since "carts" are not self-propelled) is a small vehicle designed originally to carry two golfers and their golf clubs around a golf course or on desert trails with less effort than walking.

Golf carts come in a wide range of formats such as 2, 4, and 6 seaters and are more generally used to convey small numbers of passengers short distances at speeds less than 15 mph (24 km/h) per ANSI Standard z130.1 as originally manufactured. They are generally around 4 feet (1.2 m) wide×8 feet (2.4 m) long×6 feet (1.8 m) high and weigh 900 pounds (410 kg) to 1,000 pounds (450 kg). Most are powered by 4-stroke engines.

Golf is enjoyed by a great number of people of both sexes and all ethic groups. Golf is an outdoor game and is mostly played in the summertime. It is often hot and most times humid. When it is hot and humid and the wind is not blowing many golfers begin sweating at a high rate and can become hot, dehydrated and generally uncomfortable. While using a golf cart removes the exertion in hot and humid weather from walking, it is still uncomfortable. Often a breeze or cool wind can make the difference between enjoying a round of golf and being miserable. To that effect, many golf carts are equipped with small, non-powerful, electric fans. The fans are generally 9-volt powered and have a blade length of generally ten (10) inches, such that not much wind is pushed through by the fan. This can cause overheating and general unhappiness for the golfer.

Accordingly, and in light of the foregoing, it would be desirable to provide a device that can be attachable to a golf cart that can hold a fan for providing a strong throughput of air to allow the golfer to cool off golfers for a more enjoyable experience. It would be further advantageous if the device were easily attached and detached from the golf cart as well as being portable and reusable when a next golf outing is arranged.

BRIEF DESCRIPTION OF THE DRAWINGS

FIG. 1A and FIG. 1B are illustrated views of an exemplary fan clip for a golf cart.

FIG. 2A, FIG. 2B and FIG. 2C are illustrated implemented views of the fan clip for the golf cart shown in FIG. 1A and FIG. 1B.

DETAILED DESCRIPTION

Figure 2A:
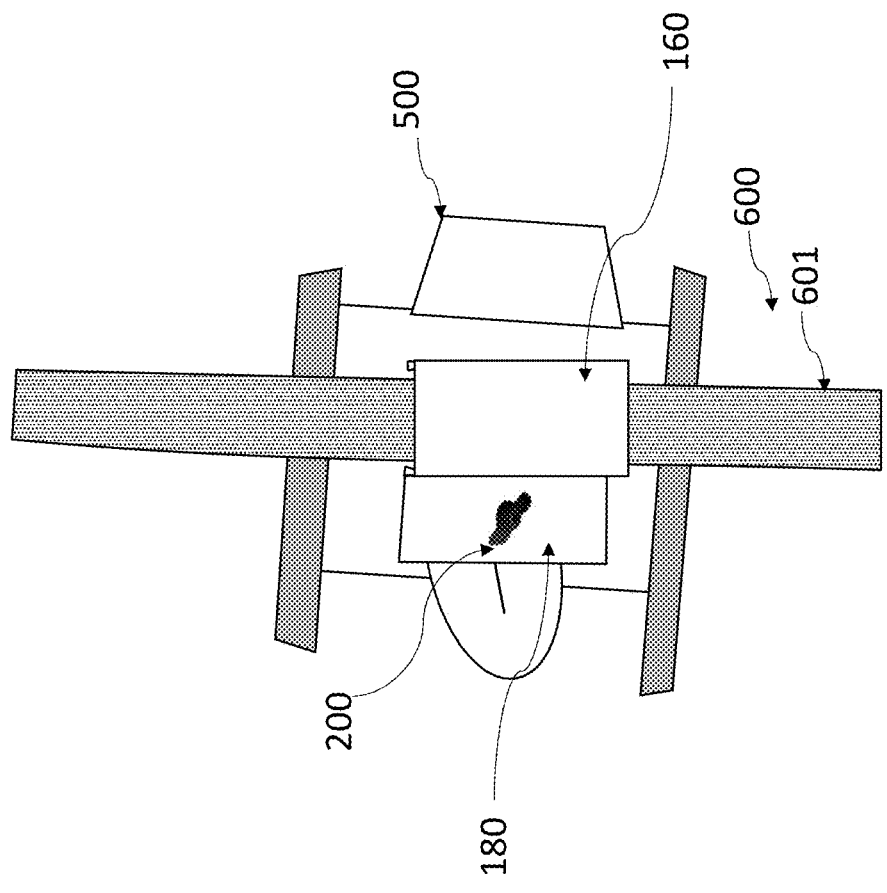

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1A and FIG. 1B, an exemplary fan clip device 100 for moving and increasing the movement of air from a fan for a golf cart is presented. The fan clip device 100 is attachable to a golf cart that can hold a fan that can provide a strong throughput of air to allow the golfer to cool off and have an enjoyable experience. The fan clip device 100 is further easily attached and detached from the golf cart as well as be portable and reusable when a next golf outing is arranged. FIG. 1A is an outside view of the fan clip device 100 and FIG. 1B is a view of an inside of the fan clip device 100.

The fan clip device 100 is preferably made of steel material, however other materials are hereby contemplated, including, but not limited to, a hard plastic, poly-vinyl chloride (PVC), etc. The fan clip device 100 preferable has an "L" shape, however other shapes are hereby contemplated, including but not limited to, "C" shape, "U" shaped, etc. The fan clip device 100 preferably has a height of one and one-half (1.5) inches, however other heights are hereby contemplated, including, but not limited to, one (1) inch, two (2) inches, etc. The fan clip device 100 preferably has a width of one and one-half (1.5) inches, however other widths are hereby contemplated, including, but not limited to, one (1) inch, two (2) inches, etc.

The fan clip device 100 has an outside 120, an inside 140, a first wall 160, two (2) support sides 165, 166 and a side plate 180. The side plate 180 has a middle portion 181 and a first side 182. The middle portion 181 of the side plate 180 has a hole 183. The hole 183 is configured to allow for a screw assembly to couple the side plate 180 to a fan see FIG. 2A-2C 500. The hole 183 of the middle 181 of the side plate 180 is preferably able to allow for a shaft 210 of a screw 200 to further be coupled to the fan 500 (see FIG. 2A-2C).

The shaft 210 of the screw 200 preferably has a length of three-eighths (⅜) inch, however other lengths are hereby contemplated, including, but not limited to, one-fourth (¼) inch, three-fourths (¾) inch, etc. The size of the shaft 210 of the screw 200 depends on the brand of the fan 500 (see FIG. 2A-2C).

Each of the two side supports 165, 166 has a first end 167 and a second end 168. The first end 167 of a first of the side supports 165 is coupled to the first side 182 of the side plate 180 by a coupling 184. The coupling 184 is preferably a weld, however any other type of coupling is hereby contemplated.

A second end 168 of the first of the side supports 165 is coupled to a first end 161 of the first wall 160 of the fan clip device 100. A first end 170 of a second of the side supports 166 is coupled to a second end 162 of the first wall 160 of the fan clip device 100.

In FIG. 1B, each of the side supports 165, 166 has an inside 171, 172. The inside 171, 172 of the side supports 165, 166 has a plurality of magnetic tapes 173. The magnetic tape 173 is preferably a strong magnet such that it securely secures and coupled the fan clip device 100 to the golf cart. Optionally and or additionally, the inside 174 of the first wall 160 has one or more of the magnetic tapes 173 such that additional strength of support and security are provided for the fan clip device 100.

Moving now to FIG. 2A, an illustrated view of a golf cart 600 with a fan 500 coupled to the fan clip device 100 is presented. The first wall 160 is coupled to a post 601 of the golf cart 600. A fan 500 is coupled to the side plate 180 by a screw 200 (shown in FIG. 1A), Now FIG. 2B is an illustrated view looking into the golf cart 600 that has the fan 500 coupled to the fan clip device 100 is presented. An outside 602 of the post 601 of the golf cart 600 has the second of the side supports visible 166 and further the fan 500 can be seen above a window 603 of the golf cart 600.

Figure 2C:
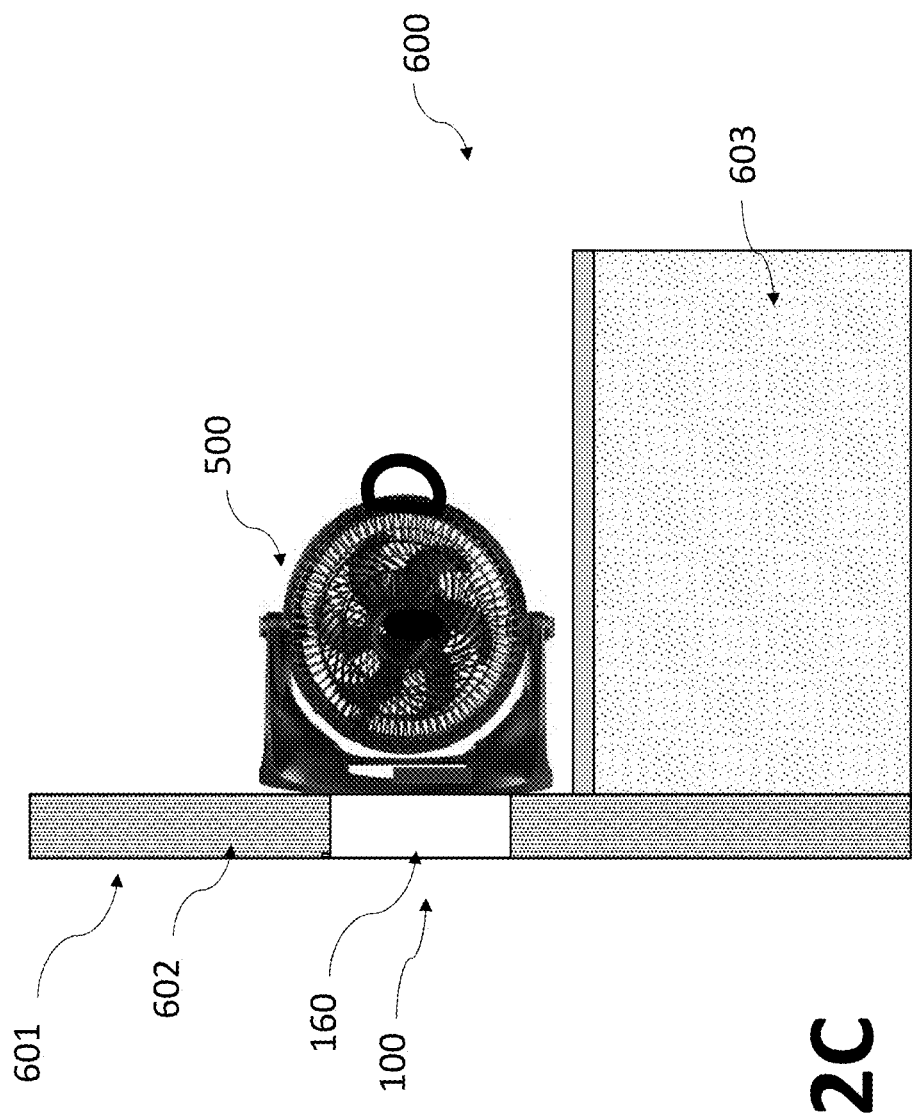

Now FIG. 2C is an illustrated view looking out of the golf cart 600 that has the fan 500 coupled to the fan clip device 100 is presented. An inside 603 of the post 601 of the golf cart 600 has the first wall 160 visible and further the fan 500 can be seen above a window 603 of the golf cart 600.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fan clip device for coupling a fan to a golf cart, the device comprising:
    an outside;
    an inside;
    a first wall, the first wall having a first end and a second end;
    two (2) side supports, each of the side supports having an inside, a first end and a second end, the second end of a first of the side supports is coupled to the first end of the first wall by a coupling, the first end of a second of the side supports is coupled to the second end of the first wall by the coupling;
    a plurality of magnetic tapes, wherein a first of the magnetic tapes being coupled to an inside of the first side support and a second of the magnetic tapes being coupled to an inside of the second of the side supports; and
    a side plate, the side plate having a first end and a middle portion, the middle portion having a hole, wherein the hole being configured to allow a screw shaft to pass through it, and wherein the first end being coupled to the first end of the first of the side supports.

2. The device of claim 1, wherein the inside of at least one of the side supports having a third of the magnetic tapes.

3. The device of claim 1, wherein the hole of the side plate having a diameter of three-eighths (⅜) inch.

4. The device of claim 1, wherein device having a height of one and one-half (1.5) inches.

5. The device of claim 1, wherein the device having a width of one and one half (1.5) inches.

6. The device of claim 1, wherein the device being made of a steel material.

7. The device of claim 1, wherein the device having an "L" shape.

* * * * *